ized Patent

United States Patent [19]
MacKarvich

[11] Patent Number: 6,116,483
[45] Date of Patent: Sep. 12, 2000

[54] SPARE WHEEL MOUNTING BRACKET

[76] Inventor: Charles J. MacKarvich, 1720 Tyler Green Trail, Smyrna, Ga. 30080

[21] Appl. No.: 09/215,032

[22] Filed: Dec. 17, 1998

[51] Int. Cl.[7] ............................. E05B 65/12; B62D 43/02
[52] U.S. Cl. .................... 224/42.24; 224/518; 224/42.12
[58] Field of Search ................................ 224/401, 42.24, 224/42.25, 42.12, 42.13, 518; 70/259, 260

[56] References Cited

U.S. PATENT DOCUMENTS

| | | | |
|---|---|---|---|
| 1,519,751 | 12/1924 | Baker ........................................ | 70/259 |
| 1,554,398 | 9/1925 | Belden ................................. | 224/42.12 |
| 1,654,752 | 1/1928 | Raleigh ..................................... | 70/259 |
| 3,428,230 | 2/1969 | Korf et al. ........................ | 224/42.24 X |
| 3,865,291 | 2/1975 | Tidwell ................................ | 224/42.24 |
| 4,516,706 | 5/1985 | Niehaus ................................ | 224/42.25 |
| 4,679,717 | 7/1987 | Hansen ................................. | 224/42.12 |
| 4,993,609 | 2/1991 | Flint ................................. | 224/42.24 X |
| 5,303,569 | 4/1994 | Wright ................................ | 224/42.24 |

FOREIGN PATENT DOCUMENTS

| | | | |
|---|---|---|---|
| 621667 | 2/1927 | France ................................. | 224/42.24 |
| 630665 | 8/1928 | France ................................. | 224/42.13 |

OTHER PUBLICATIONS

"High Mount Tire Carrier," Tie Down Engineering Marine Catalog, p. 11 (only information available).

*Primary Examiner*—Nathan J. Newhouse
*Attorney, Agent, or Firm*—Thomas, Kayden, Horstemeyer & Risley

[57] ABSTRACT

A spare wheel mounting bracket (10) includes a beam mounting plate (14), for fixing the bracket (10) to a trailer tongue, and a wheel mounting plate (12), for mounting a spare wheel to the bracket (10). An offset channel support (16) extending at an upwardly sloped angle from the beam mounting plate (14) supports the wheel mounting plate (12). The wheel mounting bracket (10) is constructed of a blank of material. A blank is cut with a predetermined perimeter form (39) having a tire mounting tab (42), side support flange tabs (44), and a beam mounting tab (40). A wheel mount opening (24) is cut into the wheel mounting tab (42) and a mounting opening (18) is cut into the beam mounting tab (40). The side support flange tab (44), wheel mounting tab (42), and the beam mounting tab (40) are folded in to form the side support flange (28), wheel mounting plate (12), and the beam mounting plate (14), respectively.

5 Claims, 3 Drawing Sheets

SPARE WHEEL MOUNTING BRACKET

TECHNICAL FIELD

The present invention is generally related to the mounting of spare wheels to vehicles and, more particularly, is related to a bracket for mounting a spare wheel on a beam structure such as the towing tongue of a boat trailer.

BACKGROUND OF THE INVENTION

When using a trailer for towing items such as a boat or a camper it is generally desirable to have a spare wheel, with an inflated tire mounted on the wheel, for the trailer in the event that one of the tires being used by the trailer becomes deflated. Since the wheels of a trailer typically are not the same size as the wheels of the car or truck that tows the trailer, the trailer must have its own spare wheel. Additionally, it is preferable that the spare wheel for the trailer is carried somewhere on the body of the trailer itself so that the spare wheel is always available to the trailer. As such, the spare wheel should be mounted on the trailer so as not to hinder the functions of the trailer. Generally, those goals can be reached by mounting a spare wheel on the trailer tongue that connects the trailer to the vehicle towing the trailer. Brackets used to mount a spare wheel to a trailer need to be sturdy, durable, and provide for easy removal and mounting of the spare wheel.

Conventional spare wheel mounting brackets used for mounting the spare wheel to the tongue of a trailer are commonly constructed of several pieces of rigid metal welded together. These brackets typically are expensive and such a welded construction is susceptible to failure at the welded joints, possibly resulting in a relatively short life for the mounting bracket. Additionally, some conventional spare wheel mounting brackets fail to provide the ability to lock the wheel mounted on the bracket to the bracket and to the trailer tongue.

With the forgoing disadvantages of the prior art in mind, it is an object of the present invention to provide a spare wheel mounting bracket that can be mounted in a stable manner to the tongue of a trailer and which securely mounts a spare wheel with its inflated tire in a secure manner on the trailer.

It is another object of the present invention to provide such a bracket that is inexpensive, sturdy, and durable, and that provides for easy mounting and dismounting of a spare wheel to a vehicle, such as a trailer.

It is a further object of the present invention to provide a spare wheel mounting bracket which is shaped to lock the spare wheel and its tire to the mounting bracket, as well as to lock the mounting bracket to the tongue upon which the bracket is mounted.

Other objects, features, and advantages of the present invention will become apparent upon reading the following specification, when taken in conjunction with the accompanying drawings.

SUMMARY OF THE INVENTION

The present invention provides a bracket and method for mounting a wheel with an inflated tire mounted thereon to a side face of a substantially rigid longitudinal structure, such as a beam, or more specifically to the tongue of a trailer for towing. Briefly described, in architecture, the bracket can be implemented as follows.

In a preferred embodiment, the present invention relates to a wheel mounting bracket for mounting a wheel and its tire on a longitudinal structure of a trailer, etc., such as a beam that is the towing tongue of a trailer. The bracket essentially comprises a unitary plate structure known as a blank which is cut and bent into a three dimensional bracket which includes a beam mounting plate having a mounting opening for attachment to the vertical side surface of a conventional box beam trailer tongue. The wheel mounting bracket is fixed to the trailer tongue by a conventional U-bolt. The wheel mounting bracket further comprises a wheel mounting plate which is disposed substantially parallel to the beam mounting plate and supported by the beam mounting plate. The wheel mounting plate includes a plurality of wheel mount openings, each of the wheel mount openings being configured to engage a bolt that mounts the hub of the spare wheel to the wheel mounting plate. An offset sloped channel support extends from between the beam mounting plate and the wheel mounting plate. The offset channel support supports the wheel mounting plate spaced away from the trailer tongue and comprises a sloped support bar and a pair of parallel side support flanges. The side support flanges are substantially perpendicular to said sloped support bar, thereby forming a channel. The beam mounting plate, wheel mounting plate and offset channel support of the wheel mounting apparatus are constructed from a blank which is folded at fold lines into the shape of the mounting bracket.

The blank is folded and shaped so that the offset sloped channel support has its flanges folded normal to its support bar, and the support bar is tilted with respect to the beam mounting plate so that the flanges engage and become supported by the beam mounting plate. Likewise, the wheel mounting plate is tilted until it engages and becomes supported by the flanges of the sloped channel support. As a result, the flanges function to transmit the load of the wheel and tire from the wheel mounting plate to the beam mounting plate.

The present invention can also be viewed as providing a method for mounting a wheel on a beam. In this regard, the method can be broadly summarized by the steps of including fixing a wheel mounting bracket to a substantially rigid beam with a beam mounting plate, supporting a wheel mounting plate on the beam mounting plate, and fixing a wheel and its tire to a wheel mounting plate on the tire mounting bracket.

The present invention can also be viewed as providing a method for manufacturing a wheel mounting bracket. In this regard, the method can be broadly summarized by the following steps including, first, forming a blank of a predetermined perimeter shape in planar form. The blank includes a wheel mounting tab, a side support flange tab, and a beam mounting tab, in one continuous piece of material. A wheel mount opening is cut into the wheel mounting tab and a mounting opening is cut into the beam mounting tab. In construction, the side support flange tab is folded into a position substantially normal to the blank, creating a side support flange; the beam mounting tab is folded toward the side support flange until the beam mounting tab contacts the side support flange, creating the beam mounting plate; and the wheel mounting tab is folded toward the side support flange until the wheel mounting tab contacts the side support flange to form the wheel mounting plate.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 2:
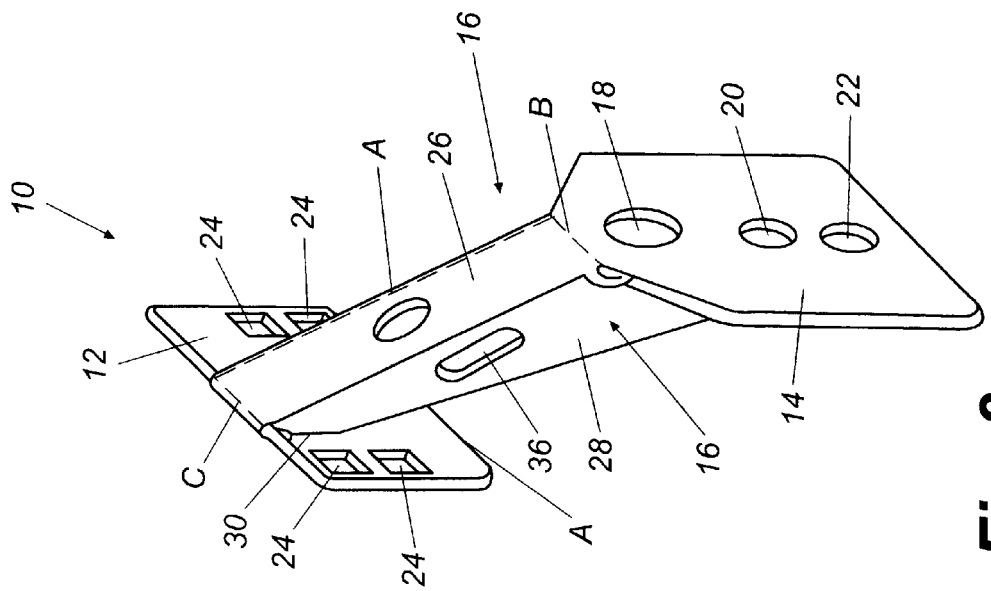
FIG. 2 is a perspective view of the back and left side of the spare wheel mounting bracket of FIG. 1.

Reference will now be made in detail to the description of the invention as illustrated in the drawings. While the invention will be described in connection with these drawings, there is not intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE INVENTION

The accompanying drawings incorporated in and forming a part of the specification illustrate several aspects of the present invention, and together with the description serve to explain the principles of the invention. The components in the drawings are not necessarily to scale, emphasis instead being placed upon clearly illustrating principles of the present invention. In the drawings appended hereto, like numerals illustrate like parts throughout the several views.

Figure 1:
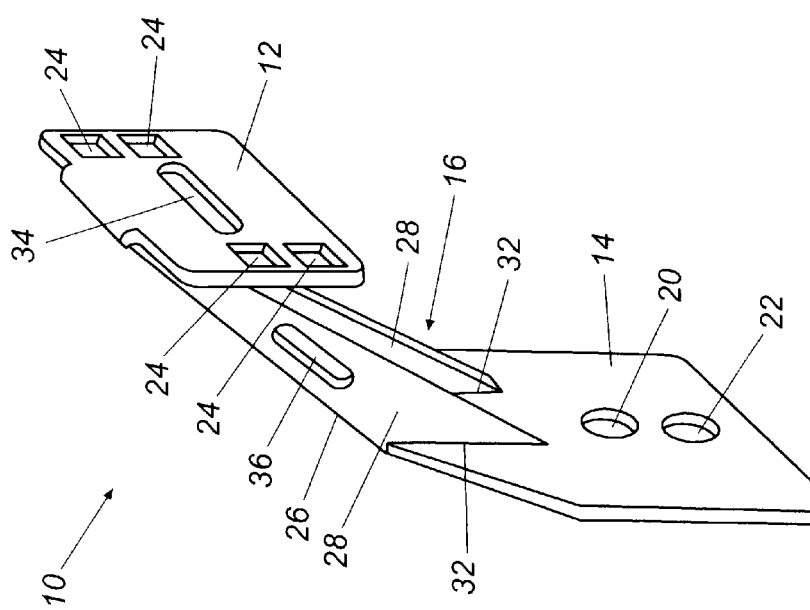
FIG. 1 is a perspective view of the front and right side of the spare wheel mounting bracket.
Figure 3:
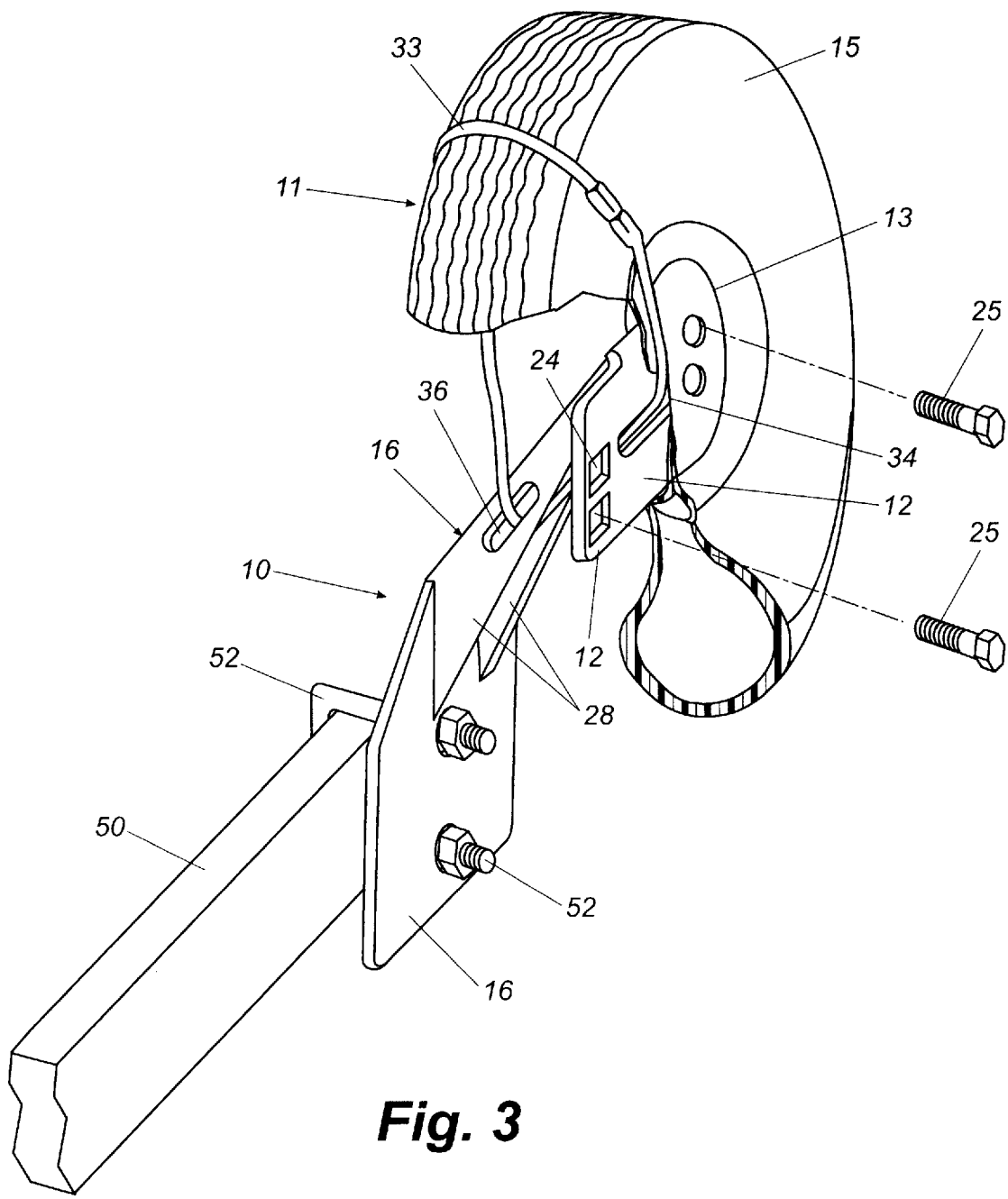
FIG. 3 is a perspective view of the front and right side of the spare wheel mounting bracket in a preferred method of use.

FIGS. 1 and 2 illustrate the spare wheel mounting bracket 10 for mounting the spare wheel 11 to a trailer, etc. The wheel mounting bracket 10 is preferably used to mount a spare wheel 11 on the tongue of a trailer for towing items such as a boat, a camper, horses or the like. The wheel mounting bracket 10 includes a wheel mounting plate 12 supported by a beam mounting plate 14 via an offset channel support 16, with the channel support attached to the upper edges of both mounting plates. In a preferred embodiment, the beam mounting plate 14 includes a plurality of mounting openings 18, 20 and 22. The plurality of mounting openings enable the bracket 10 to be mounted on a beam structure, such as the tongue 50 of a trailer for towing, using a fastening mechanism, such as a U-shaped bolt 52 (FIG. 3).

As illustrated in FIG. 2, it is preferred that the plurality of mounting openings 18 includes a first mounting opening 18 that is substantially elongated in shape. A pair of second mounting opening 20 and 22 are formed in the beam mounting plate 14 and at a predetermined distance from the first mounting opening 20. The combination of the substantially elongated first mounting opening 18 and the pair of second mounting openings 20 and 22, enables the bracket 10 to be mounted on beam structures of various sizes, rendering the wheel mounting bracket 10 more versatile with respect to the size trailer tongue with which the bracket 10 is compatible.

Preferably, the wheel mounting plate 12 includes a plurality of wheel mount openings 24. The wheel mount openings 24 are sized to receive a wheel bolt 25 to fix a wheel 11 on the wheel mounting plate 12. Preferably, the wheel mount openings 24 are configured to receive the wheel bolts existing on a wheel as manufactured. The wheel mount openings 24 are arranged on the wheel mounting plate 12 such as to receive the wheel bolts of wheels of various sizes, rendering the wheel mounting bracket 10 versatile in the size of spare wheel that can be mounted thereon.

In a preferred embodiment, the wheel mounting plate 12 is connected to the beam mounting plate 14 by an offset channel support 16. The offset channel support 16 preferably includes a sloped support bar 26 and a pair of parallel side support flanges 28. The side support flanges 28 each are preferably substantially tapered such as to be narrower at their ends adjacent the wheel mounting plate 12 where their facing surfaces 30 (FIG. 2) contact the surface of the beam mounting plate 14, and wider at the beam mounting plate 14 contact 32 (FIG. 1). The preferred tapered configuration provides support for compression forces present in response to mounting a spare wheel on the bracket 10, where the weight of the wheel is transmitted through the contacts 32 to the beam mounting plate. The sloped support bar 26 of the offset channel support 16 extends as one continuous piece of material between the upper edges of the beam mounting plate 14 and the wheel mounting plate 12.

It is preferred that a wheel mounted on the wheel mounting bracket 10 can be locked onto the wheel mounting bracket and the trailer tongue, to deter theft, by using a longitudinally flexible locking device, such as a bicycle lock 33 or similar type elongated lock. The wheel mounting plate 12 preferably includes a wheel lock opening 34 (FIG. 1). Each of the side support flanges 28 of the offset channel support 16 includes a bracket lock opening 36. (FIGS. 1 and 2) The wheel lock opening 34 and the bracket lock opening 36 are preferably substantially elongated in shape to facilitate easier and more versatile use, making it easier to slide a longitudinal substantially flexible member through the opening and providing openings that are accommodating to mount or lock other devices of various sizes and configurations to the offset channel support.

Illustrated in FIG. 3 is a preferred method for mounting a wheel on a substantially rigid beam, such as the tongue 50 of a trailer for towing. The wheel mounting bracket 10 is first mounted on the trailer tongue 50 at the beam mounting plate 14. A fastening mechanism 52, such as a U-shaped bolt, is used to fix the wheel mounting bracket 10 to the trailer tongue 50. The wheel mounting bracket 10 is oriented such that the wheel mounting plate 12 extends in a vertical plane above and laterally away from the trailer tongue 50 on which the bracket 10 is mounted. When the preferred U-shaped bolt is used, the two free ends of the U-shaped bolt are engaged in two of the plurality of mounting openings 20 and 22. Preferably, one free end of the bolt is engaged into the elongated first mounting opening 20, and the other free end of the bolt is engaged into one of the pair of second mounting openings 22, and fixed therein. A wheel 11 with its rim 13 and inflated tire 15 is oriented parallel to and mounted on the outer face of the wheel mounting plate 12 such that the wheel faces away from the trailer tongue 50. The wheel bolts 25 are received by a combination of the plurality of wheel mount openings 24, the combination depending on the size and bolt configuration of the wheel to be mounted.

In a preferred locking method the mounted wheel 11 is locked to the trailer tongue (beam) 50 and the wheel mounting bracket 10 using a longitudinally flexible locking mechanism 33, such as a bicycle lock. One free end of the lock is threaded through the hub opening of the rim 13 of the wheel 11, through the wheel lock opening 34, one or both of the bracket lock openings 36, and around the trailer tongue 50 upon which the bracket 10 is mounted, then locked to the second free end of the lock mechanism. The lock mechanism 33 interconnects the wheel 11, the wheel mounting bracket 10, and the trailer tongue 50 to deter theft of the spare wheel 54.

Figure 4:
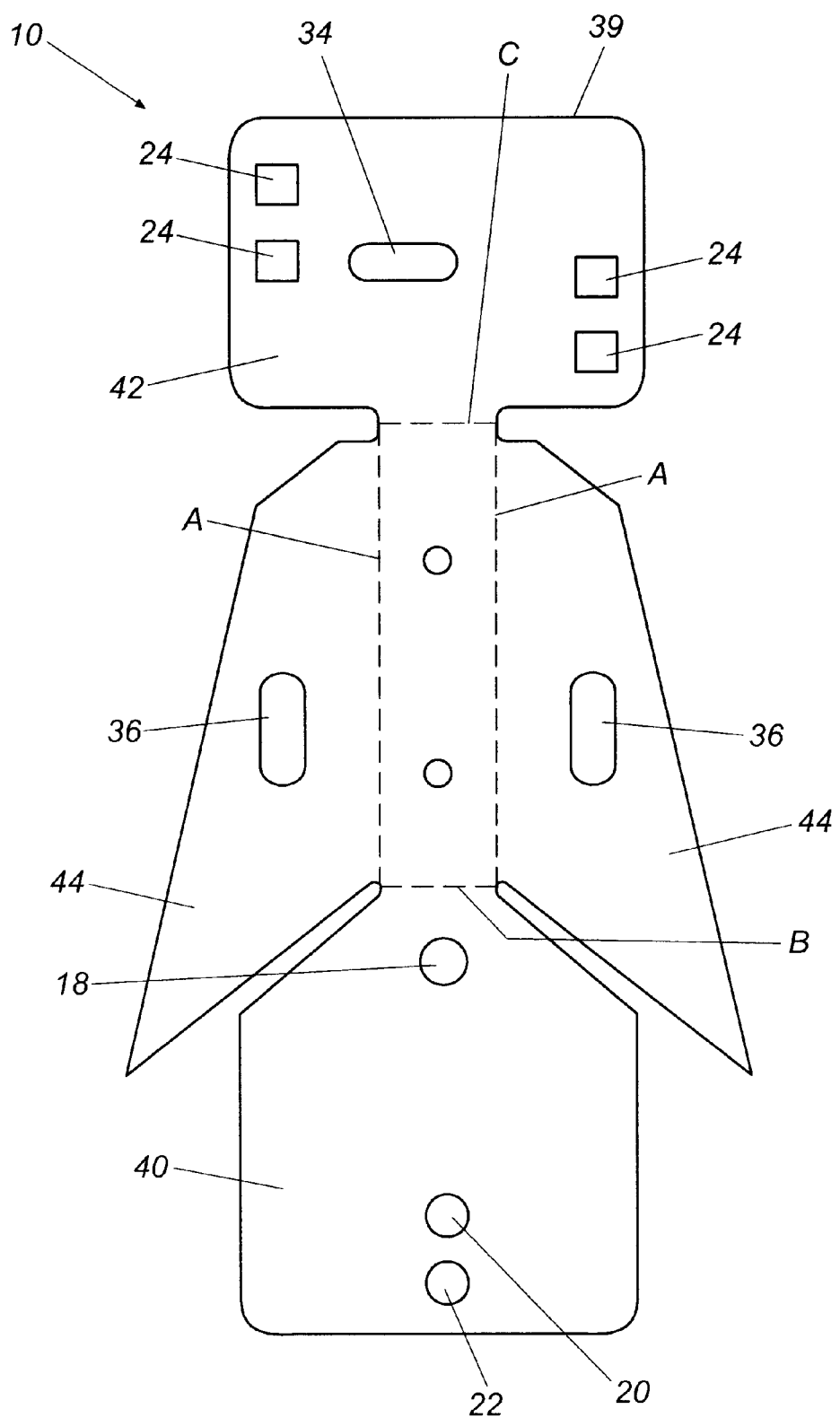
FIG. 4 is a plan view of a blank which is later formed to the wheel mounting apparatus of FIGS. 1 and 2.

In a preferred method of manufacture, a single piece of material is cut into a blank of predetermined perimeter shape in planar form 39, illustrated in FIG. 4. The blank includes a beam mounting tab 40, a wheel mounting tab 42, and a plurality of side support flange tabs 44. Preferably, included in the blank 39 are a plurality of mounting openings 18, 20 and 22 formed in the beam mount tab 40; a bracket lock opening 36 formed in each of the side support flange tabs 44; a wheel lock opening 34 centrally positioned in the wheel mount tab 42; and a plurality of wheel mount openings 24 formed in the wheel mount tab 42. In forming the wheel mounting bracket 10, the blank 39 is first bent along dashed lines A such that each of the side support flange tabs 44 become substantially normal to the surface of the unbent blank 39, forming the side support flanges 28 of the offset channel support 16 (FIGS. 1 and 2).

The blank 39 is bent along dashed line B at what becomes the upper edge of the beam mounting plate, by bending the beam mounting tab 40 toward the side support flanges 28 until the beam mounting tab 40 contacts the side support flanges 28, forming the beam mounting plate 14 (FIGS. 1 and 2).

The blank 39 is bent along dashed line C at what becomes the upper edge of the wheel mounting plate, by bending the wheel mounting tab 42 toward the side support flanges 28 until the wheel mounting tab 42 contacts the side support flanges 28, forming the wheel mounting plate 12. (FIGS. 1 and 2) FIG. 2 illustrates the fold lines A, B, and C relative to the wheel mounting bracket 10. Preferably, the contacts 30 (FIG. 2) between the side support flanges 28 and the wheel mounting plate 12, and the contacts 32 (FIG. 1) between the side support flanges 28 and the beam mounting plate 14, are welded. However, the mounting of a wheel 11 on the bracket 10, formed as described above, exerts compression forces from the weight of the wheel through the side support flanges to the beam mounting plate 14, which does not require welding of the parts together to support the wheel. The weight of the wheel and the resultant compression forces reinforce the shape of the bracket 10. Further, the unibody construction eliminates the necessity of welded joints holding the plates together.

While the drawings and foregoing description disclose a preferred embodiment of the invention, it will be understood that variations and modifications may be made to the above-described embodiment of the invention without departing substantially from the spirit and principles of the invention as set forth in the following claims. All such modifications and variations are intended to be included herein within the scope of the present invention.

What is claimed is:

1. A spare wheel mounting bracket comprising:
   a beam mounting plate;
   said beam mounting plate defining a plurality of mounting openings, said beam mounting plate being fixable to a beam at said mounting openings;
   a wheel mounting plate, said wheel mounting plate supported by said beam mounting plate, said wheel mounting plate disposed substantially parallel to said beam mounting plate;
   said wheel mounting plate defining a plurality of wheel mount openings, each of said wheel mount openings configured to engage a wheel bolt; and
   an offset channel support extending from said beam mounting plate to said wheel mounting plate and disposed therebetween, said offset channel support having a sloped support bar and at least one side support flange, said at least one side support flange being substantially perpendicular to said sloped support bar;
   wherein said beam mounting plate, said wheel mounting plate and said offset channel support are characterized by having been formed from a unitary plate structure which is one continuous piece of material that is bent to form said plates and said support.

2. The spare wheel mounting bracket of claim 1 wherein:
   said wheel mounting plate having at least one opening for receiving a wheel lock; and
   said at least one side support flange of said offset channel support having at least one opening for receiving a wheel lock, wherein said wheel lock is a substantially flexible longitudinal member to join together the beam upon which said spare wheel mounting bracket is mounted, said spare wheel mounting bracket, and a spare wheel mounted upon said spare wheel mounting bracket.

3. The spare wheel mounting bracket of claim 1, wherein a portion of said at least one side support flange of said offset channel support is welded to said beam mounting plate.

4. The spare wheel mounting bracket of claim 1, wherein a portion of said at least one side support flange of said offset channel support is welded to said wheel mounting plate.

5. A spare wheel support bracket for supporting a spare wheel on a tongue of a trailer, said spare wheel support bracket comprising:
   (a) a wheel mounting plate for mounting in a vertical attitude and having an upper edge for extending upwardly when said support bracket is mounted on a tongue of a trailer, and having openings formed therein for bolting a spare wheel thereto;
   (b) a beam mounting plate oriented substantially parallel to and offset from the plane of said wheel mounting plate having an upper edge for extending upwardly when said support bracket is mounted on a tongue of a trailer and having openings therein for bolting to a tongue of a trailer;
   (c) an offset channel support extending at an angle to and between said beam mounting plate and said wheel mounting plate and having opposed ends continuous to said beam mounting plate and to said wheel mounting plate for positioning the wheel mounting plate offset laterally and above said beam mounting plate;
   (d) said offset channel support having a support bar sloped between and intersecting the upper edges of said beam mounting plate and said wheel mounting plate and a pair of side support flanges extending parallel to each other and substantially normal to and toward said beam mounting plate and substantially normal to and toward said wheel mounting plate, said parallel side support flanges each having opposed ends engaging said beam mounting plate and said wheel mounting plate;
   (e) said beam support plate, said wheel support plate and said offset channel support all being formed of a single blank of material by bends having been formed in the blank of material;
   (f) whereby when the spare wheel support bracket is mounted on a tongue of a trailer by bolting the beam mounting plate to the tongue with the wheel mounting plate positioned offset laterally and above the beam mounting plate, the weight of a spare wheel mounted to the wheel mounting plate is communicated to the wheel mounting plate, from the wheel mounting plate to the side support flanges of the offset channel support, from the side support flanges to the beam support plate, and from the beam support plate to a tongue of a trailer.

* * * * *